(12) United States Patent
Huang et al.

(10) Patent No.: US 9,193,606 B2
(45) Date of Patent: Nov. 24, 2015

(54) DEVICE FOR PURIFYING A WATER SINK

(71) Applicants: Chun-Ping Huang, Taoyuan County (TW); Jhih-Jhong Huang, Taoyuan County (TW)

(72) Inventors: Chun-Ping Huang, Taoyuan County (TW); Jhih-Jhong Huang, Taoyuan County (TW)

(73) Assignee: Institute of Nuclear Energy Research, Atomic Energy Council, Jiaan Village, Longtan District, Taoyuan (TW)

( * ) Notice: Subject to any disclaimer, the term of this patent is extended or adjusted under 35 U.S.C. 154(b) by 218 days.

(21) Appl. No.: 13/964,116

(22) Filed: Aug. 12, 2013

(65) Prior Publication Data

US 2015/0041378 A1 Feb. 12, 2015

(51) Int. Cl.
*B01D 29/68* (2006.01)
*G21F 9/12* (2006.01)
*C02F 1/00* (2006.01)
*B01D 24/22* (2006.01)
*B01D 24/00* (2006.01)
*B01D 24/46* (2006.01)
*C02F 1/28* (2006.01)
*C02F 101/00* (2006.01)

(52) U.S. Cl.
CPC ............ *C02F 1/004* (2013.01); *B01D 24/008* (2013.01); *B01D 24/22* (2013.01); *B01D 24/4631* (2013.01); *B01D 29/68* (2013.01); *B01D 2201/342* (2013.01); *C02F 1/28* (2013.01); *C02F 2101/006* (2013.01); *G21F 9/12* (2013.01)

(58) Field of Classification Search
CPC ...... C02F 1/42; C02F 2101/006; C02F 1/004; C02F 1/28; B01D 24/007; B01D 24/008; B01D 24/22; B01D 24/4631; B01D 29/68; B01D 35/02; B01D 2201/304; B01D 2201/342; G21F 9/12
USPC ......... 210/237, 240, 275, 282, 284, 291, 335, 210/344, 682; 376/272
See application file for complete search history.

(56) References Cited

U.S. PATENT DOCUMENTS

| | | | | |
|---|---|---|---|---|
| 4,280,906 A * | 7/1981 | Liljegren | ................. | 210/282 |
| 4,511,500 A * | 4/1985 | Guilloteau | ................. | 376/272 |
| 4,828,691 A * | 5/1989 | Abbott et al. | ............... | 210/87 |
| 4,906,381 A * | 3/1990 | Barbaro | ................... | 210/660 |
| 2006/0180550 A1 * | 8/2006 | Moore | ..................... | 210/660 |

FOREIGN PATENT DOCUMENTS

DE 19640297 A1 * 12/1997
EP 1762290 A1 * 3/2007

* cited by examiner

*Primary Examiner* — Matthew O Savage

(57) ABSTRACT

A device for purification of water sink is provided to remove radioactive substances in a water sink of nuclear facilities. The device for purification of water sink of the present invention relates to a detachable structure for repeating process, changing the height of the device according to the water level, and moving the device. The device is filled with filter agent or adsorbent in each basket assemblies and put into a water sink for purification process. After purification process of water sink, the highly contaminated waste filter agent or waste adsorbent within the basket assemblies is easy to be removed from the device for drying. The number of basket assemblies is able to be reduced in accordance with the water level drop for draining fluid from the water sink at lower level water.

6 Claims, 4 Drawing Sheets

DEVICE FOR PURIFYING A WATER SINK

BACKGROUND OF THE INVENTION

1. Field of the Invention

The present invention relates to a device for purifying a water sink provided to eliminate radioactive substances from a water sink.

2. Description of Related Art

A conventional device for purifying a water sink is mounted in a certain space for shielding radioactive substances, yet purification materials of the conventional device attach highly polluted substances, the operating space is limited, and radioactive contamination incurs easily.

Furthermore, a conventional method for purifying a water sink has the following disadvantages:
The device for purifying water sink is fixed without being moved, occupies operating space, and cannot adjust its height according to using requirement.

The present invention has arisen to mitigate and/or obviate the afore-described disadvantages.

SUMMARY OF THE INVENTION

The primary object of the present invention is to provide a device for purifying water sink. The components of the device for purifying water sink are assembled in a stack structure so that the height of the device is adjustable in accordance with purification rate or variation of water level of the water sink. The device of the present invention exploits basket assemblies in a stack structure to separate fluids and solids apart in the water sink for drying radioactive substances.

Further object of the present invention is to provide a device for purifying water sink in which the size of the basket assembly matches with regular waste container so that it can be loaded without need of particular size container. Likewise, the device is shielded with a radioactive shielding cover after being hanged and moved out of water sink by means of a hanging rope, thereby protecting workers from radioactive contamination and easing maintenance works.

Further object of the present invention is to provide a device for purifying water sink after eliminating radioactive substances. The device for purifying water sink of the present invention is loaded under water without protective radioactive shield cover during operating process. It is thus capable to save working space in a confined working site, remove subsequent highly contaminated stuffs, such as filter or absorbent materials, and prevent further radioactive contamination, To achieve the objects mentioned above, a device for purifying water sink of the present invention comprises a base used to fix the device, in which a plurality of hanging rings are provided on the base to hang and carry the device; a plurality of water inlet/outlets rendered on a water collector to flow fluid, wherein the water collector is used for collecting fluid being filtered; a plural sealing washers for fluid leakage proof, a plural basket assemblies filled with filter agent or adsorbent; a plurality of spacer lip seals for positioning at least one basket assembly, wherein each spacer lip seal has two sealing washer attached thereon; a plurality of holding rods longitudinally inserting through at least one fixing ring; a top cover facilitating fluid flow during backwashing; a water pump erected beside the water sink; a radioactive shielding cover shielding the plural basket assemblies after the device being moved out of the water sink; and a hanging rope for hanging and moving the device.

The above and other objects, features and advantages of the present invention will become apparent from the following detailed description taken with the accompanying drawings.

DETAILED DESCRIPTION OF THE PREFERRED EMBODIMENTS

Figure 1:
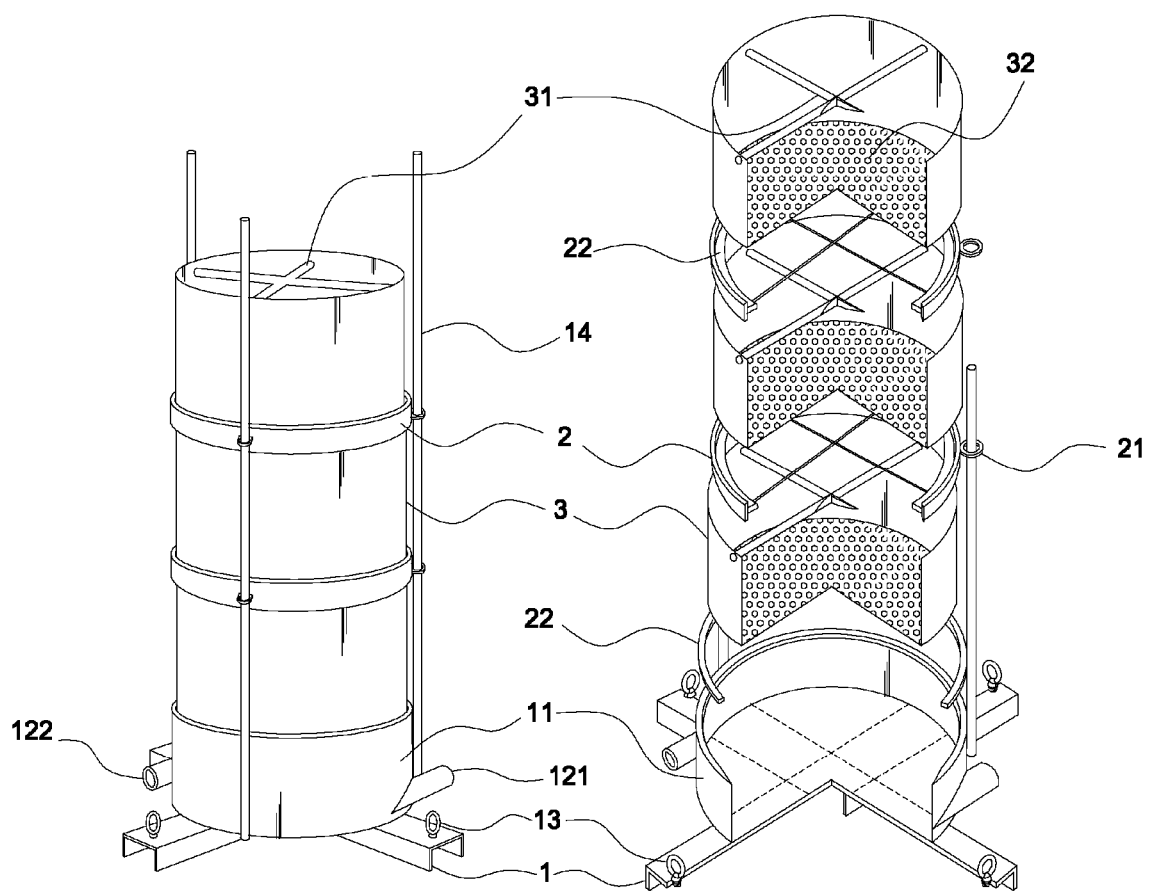
FIG. 1 is a perspective view of the device for purifying water sink according to the present invention.

FIG. 1 is a perspective view of a device for purifying a water sink of the present invention which comprises: a base 1 provided in a water sink; a plurality of hanging rings 13 disposed on the base 1 for hanging and carrying; a water collector 11 fixed on the base 1 for collecting filtrates including an upper lip rendered on the top of the water collector 11 for placing a basket assembly 3; a plurality of water inlet/outlet 121 provided on the peripheral of the water collector 11 for flowing fluid in or out by connecting to a water pump 5, wherein the water inlet/outlet 121 have at least one spare water inlet/outlet 122 for accelerating the purification or backwashing process by adding water pumps 5; plural sealing washers 22 mounted on the water collector 11 and on the top and bottom sides of a plurality of spacer lip seals 2 for leakage-proof; one or plural basket assemblies 3 each having a cross hanging mechanism 31 on the top of the basket assembly 3 for lifting with a hanging rope 7 and a mesh screen 32 at the bottom of the basket assembly 3 for carrying filter agent or adsorbent; plural spacer lip seals 2 with an upper and a lower lip provided for holding the both upper side and lower side of basket assembly 3 from shifting, and having at least three fixing rings 21 provided on the peripheral of the spacer lip seal 2; and plural holding rods 14 fixed on the peripheral of the water collector 11 longitudinally inserting through the fixing rings 21 provided on the peripheral of the spacer lip seals 2.

Figure 2:
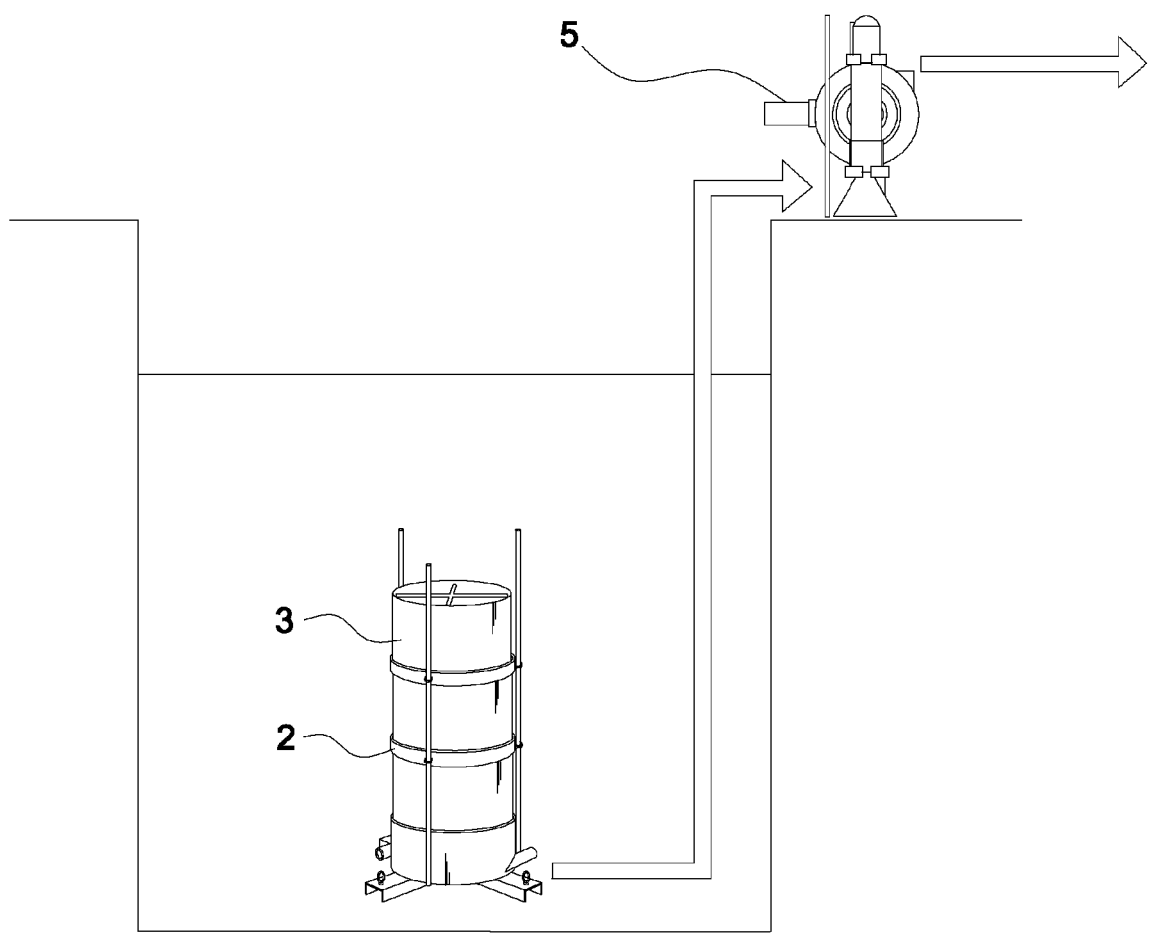
FIG. 2 is a preferred embodiment of purifying process using the device for purifying water sink according to the present invention.

FIG. 2 is a preferred embodiment of purifying process using the device for purifying water sink of the present invention. The water in water sink containing radioactive substance is filtered by flowing from top to bottom through the device for purifying water sink, and drained by a water pump 5 after being detected without radioactive contaminated substance.

Figure 3:
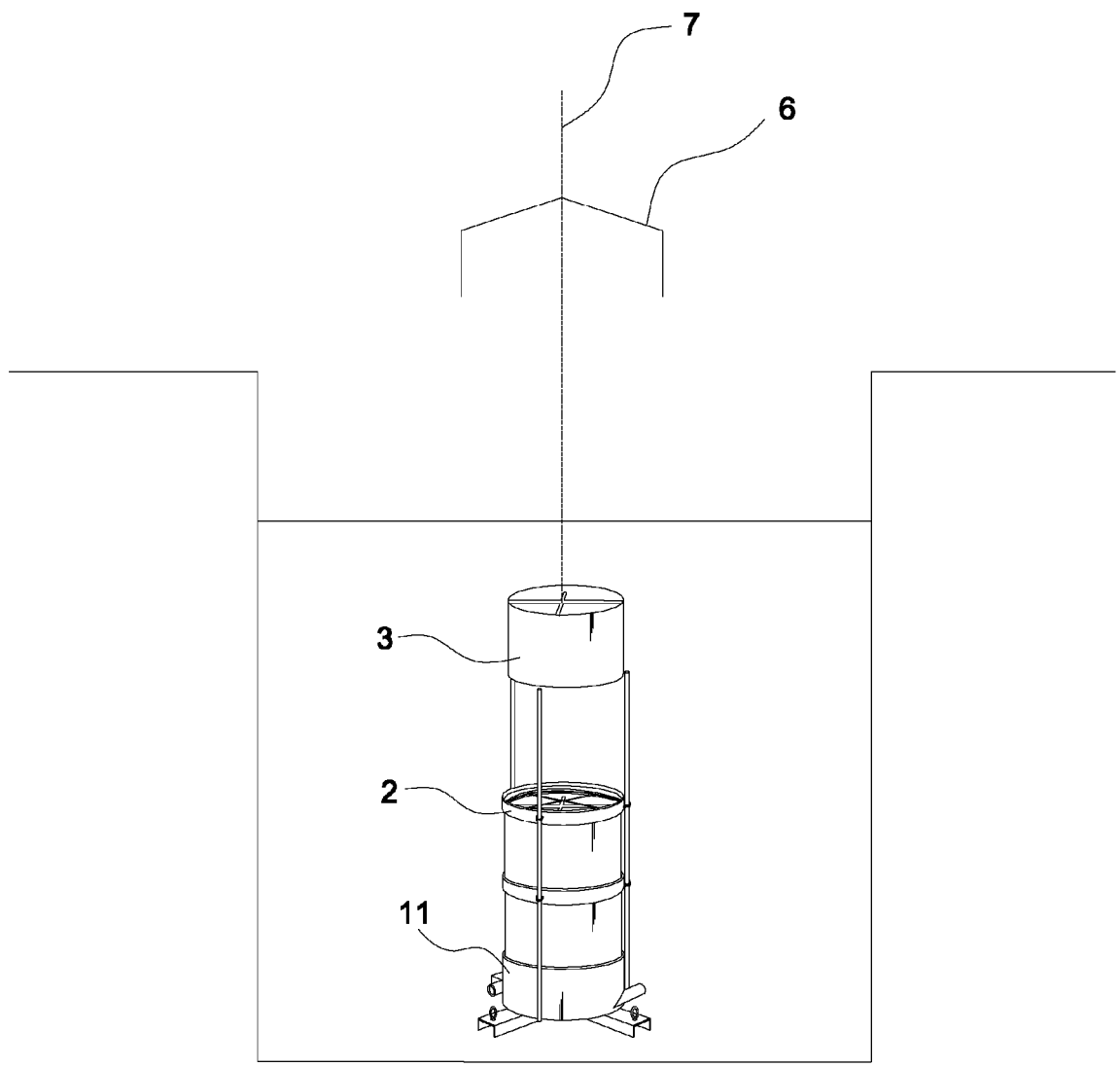
FIG. 3 is a preferred embodiment of removing the basket assemblies from the device for purifying water sink according to the present invention.

FIG. 3 is a preferred embodiment of the device for purifying water sink of the present invention. The basket assembly 3 filled with highly contaminated waste filter agent or waste adsorbent is removed from water sink by a hanging rope 7 for replacing. The basket assembly 3 is shielded by a radioactive shielding cover 6 after Being moved out from the water of the water sink to prevent from pollution.

Figure 4:
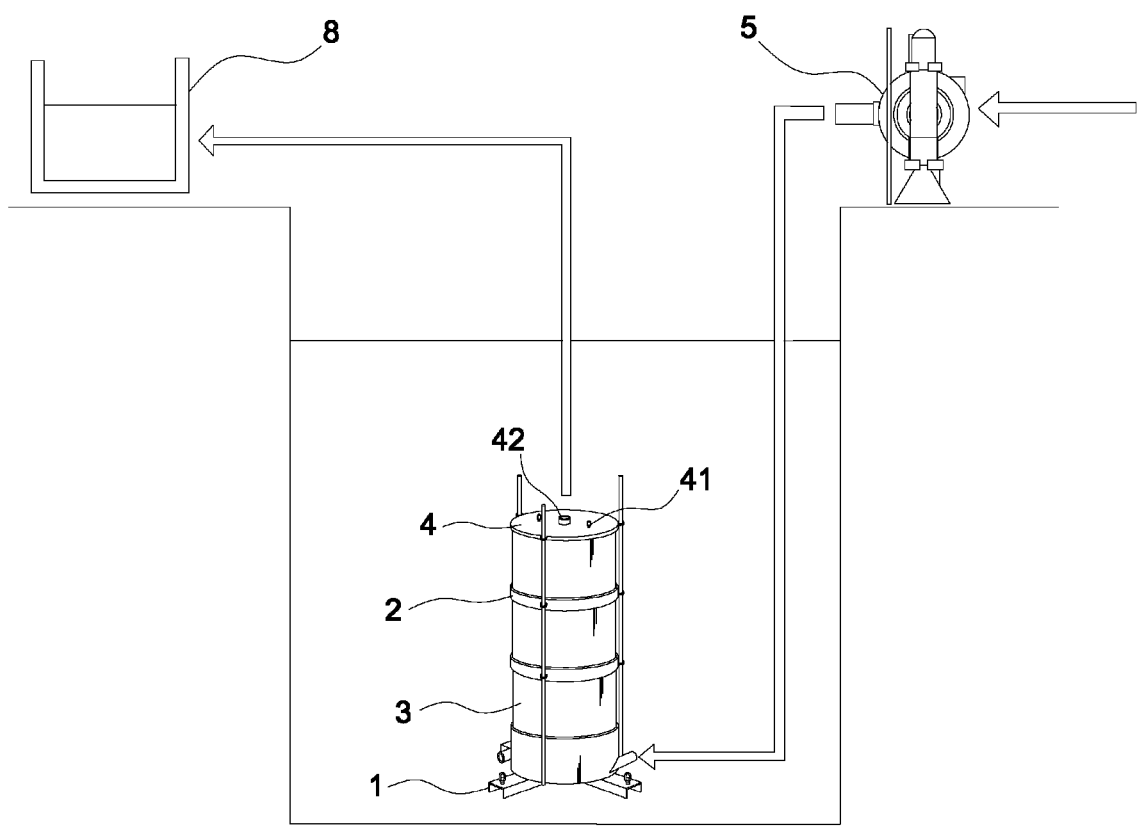
FIG. 4 is a preferred embodiment of backwashing process using the device for purifying water sink according to the present invention.

FIG. 4 is a backwashing process using the device of the present invention, wherein a top cover 4 is adding on the top surface of upper most basket assembly 3 during backwashing process. The top cover 4 has at least two hanging rings 41 disposed on the top cover 4 for lifting or removing the top cover 4 for purification process and a water exit 42 on the top cover 4 for draining waste water to a waste water collecting basin 8 outside the water sink.

The purification process using the device for purifying water sink comprises the steps as follow:
1) Installing, wherein a base 1 on which fixed with a water collector 11, one or plural spacer lip seals 2, and plural basket assemblies 3 are assembled together forming a device for purifying a water sink, and then the device is moved into the water sink, wherein each the plural basket assembly 3 filled with filter agent or adsorbent;
2) Purifying, wherein fluid in the water sink is filtered by filter agent or adsorbent filled in the plural baskets 3, thereafter a water pump 5 is used to draw fluid which is filtered by the filter agent or adsorbent filled in the plural baskets 3, such that after the fluid is tested and confirmed that it is not polluted, the fluid is drained into a waste water collecting basin 8.
3) Backwashing, wherein a top cover 4 is installed on a top basket assembly 3 of the device, and clean fluid is flowed to the top basket assembly 3 from a bottom basket assembly 3 through waste filter agent or waste adsorbent filled in the plural basket assemblies 3, thereafter the fluid containing radioactive substance is drained into the waste water collecting basin 8.
4) Replacing, wherein the base 1, the plural spacer lip seals 2, the plural basket assemblies 3, and the top cover 4 of the device are hanged and moved out of the water sink, and the plural basket assemblies 3 are shielded by the radioactive shielding covers 6 during replacing works.
5) Restarting purifying process.

According to above statement, a water sink purification device of the present invention provides a radiation purification device loaded in water sink without an extra shelter. The present invention is not only saving the space around the water sink, but also solving the problem of working space insufficiency, radiation protection, and pollution diffusion.

While the foregoing is representative of the preferred practice of the present invention, various changes in the arrangements and details of construction of the embodiments disclosed herein may be made without departing from the spirit and scope of the present invention, as defined in the appended claims.

What is claimed is:

1. A device for purifying water disposed within a sink comprising:
    a base having a bottom surface and a top surface, wherein the bottom surface of the base is adapted to be positioned on the bottom of the sink;
    a plurality of hanging rings disposed on the top surface of the base;
    a water collector for collecting filtrate or receiving a backwashing fluid, wherein the water collector includes a bottom surface that is fixed on the top surface of the base, and an upper lip rendered on a top of the water collector, wherein the upper lip defines an upwardly facing surface;
    at least one water connection provided on a vertical outer peripheral surface of the water collector for flowing the filtrate out of the collector or receiving a backwashing fluid into the collector, wherein the water connection is to be connected to a pump;
    a plurality of basket assemblies each said basket assembly having a top and a bottom, and each basket assembly being provided with a mesh screen at the bottom of the basket assembly for carrying filter agent or adsorbent;
    a quantity of filter agent or absorbent disposed on the mesh screen of each said basket assembly;
    a plurality of spacers that are separable from the basket assemblies, wherein each one of said spacers fixes the top of one of the basket assemblies to the bottom of an adjacent one of the basket assemblies, and wherein each said spacer includes an upwardly facing surface and a downwardly facing surface;
    wherein the bottom of a lowermost one of the plurality of basket assemblies is received within the upper lip of the water collector;
    a plurality of sealing washers, wherein one of said sealing washers is mounted between the upwardly facing surface of the upper lip of the water collector and the bottom of the lowermost one of the plurality of basket assemblies, and wherein one of said seals is mounted between the top of each of the basket assemblies and the downwardly facing surface of each of the spacers, and wherein one of the seals is mounted between the bottom of each of the basket assemblies and the upwardly facing surface of each of the spacers;
    a plurality of fixing rings disposed on an outer vertical peripheral surface of each of the spacers, wherein the fixing rings of each of the spacers are vertically aligned with the fixing rings of the other spacers; and
    a plurality of holding rods fixed on an outer vertical peripheral surface of the water collector, wherein each of the holding rods is inserted vertically through the vertically aligned fixing rings of the spacers.

2. The device for purifying water disposed within a sink as claimed in claim 1, wherein the water collector includes a spare connection for flowing filtrate out of the collector or for receiving a backwashing fluid for accelerating a purification or a backwashing process, respectively, by enabling the connection of an additional pump.

3. The device for purifying a water disposed within a sink as claimed in claim 1, wherein each said basket assembly includes a cross hanging mechanism on the top of the basket assembly for lifting the respective basket assembly with a hanging rope.

4. The device for purifying water disposed within a sink as claimed in claim 1, wherein each said spacer includes an upper lip and a lower lip, wherein the upper lip receives the bottom of one of the upper basket assemblies and the lower lip receives the top of one of the lower basket assemblies for holding the basket assemblies from shifting relative to each other, and wherein each said spacer has at least three fixing rings provided on the peripheral surface of the spacer for receiving the holding rods.

5. The device for purifying water disposed within a sink as claimed in claim 1, wherein the said device further comprises a radioactive shielding covers cover for shielding one of the basket assemblies after the basket assembly is removed from the water.

6. The device for purifying water disposed within a sink as claimed in claim 1, wherein said device further comprises a top cover rendered on the top surface of the upper most basket for receiving backwashing fluid, the top cover having at least two hanging rings for lifting the top cover, and a water exit on the top cover for draining waste water to a waste water collecting basin located outside the water sink.

\* \* \* \* \*